United States Patent [19]

Lund et al.

[11] Patent Number: 4,842,764

[45] Date of Patent: Jun. 27, 1989

[54] AZEOTROPE-LIKE COMPOSITIONS OF 1,1-DICHLORO-1-FLUOROETHANE AND METHANOL

[75] Inventors: Earl A. E. Lund, West Seneca; Robert G. Richard, Cheektowaga; Ian R. Shankland; David P. Wilson, both of Williamsville, all of N.Y.

[73] Assignee: Allied-Signal Inc., Morris Township, Morris County, N.J.

[21] Appl. No.: 189,932

[22] Filed: May 3, 1988

[51] Int. Cl.[4] .......................... C09D 9/00; C11D 7/50; C23G 5/02
[52] U.S. Cl. .................................... 252/171; 252/170; 252/172; 252/153; 252/162; 134/12; 134/38; 134/39; 134/40
[58] Field of Search ............... 252/171, 172, 153, 162; 134/12, 38, 39, 40

[56] References Cited

U.S. PATENT DOCUMENTS

| | | | |
|---|---|---|---|
| 3,936,387 | 2/1976 | Reusser | 252/171 |
| 4,035,258 | 7/1977 | Reusser | 252/171 |
| 4,092,262 | 5/1978 | Reusser | 252/171 |
| 4,131,559 | 12/1978 | Reusser | 252/171 |
| 4,131,561 | 12/1978 | Reusser | 252/171 |

OTHER PUBLICATIONS

Anon., Research Disclosure, vol. 162, p. 70 (1977).

*Primary Examiner*—Paul Lieberman
*Assistant Examiner*—Ronald A. Krasnow
*Attorney, Agent, or Firm*—Jay P. Friedenson

[57] ABSTRACT

Azeotrope-like compositions comprising 1,1-dichloro-1-fluoroethane and methanol are stable and have utility as degreasing agents and as solvents in a variety of industrial cleaning applications including cold cleaning and defluxing of printed circuit boards.

8 Claims, No Drawings

4,842,764

AZEOTROPE-LIKE COMPOSITIONS OF 1,1-DICHLORO-1-FLUOROETHANE AND METHANOL

FIELD OF THE INVENTION

This invention relates to azeotrope-like mixtures of 1,1-dichloro-1-fluoroethane and methanol. These mixtures are useful in a variety of vapor degreasing, cold cleaning and solvent cleaning applications including defluxing.

CROSS-REFERENCE TO RELATED APPLICATION

Co-pending, commonly assigned application Ser. No. 189,915, filed May 3, 1988, discloses azeotrope-like mixtures of 1,1-dichloro-1-fluoroethane, methanol and nitromethane and their use as solvents.

BACKGROUND OF THE INVENTION

Vapor degreasing and solvent cleaning with fluorocarbon based solvents have found widespread use in industry for the degreasing and otherwise cleaning of solid surfaces, especially intricate parts and difficult to remove soils.

In its simplest form, vapor degreasing or solvent cleaning consists of exposing a room temperature object to be cleaned to the vapors of a boiling solvent. Vapors condensing on the object provide clean distilled solvent to wash away grease or other contamination. Final evaporation of solvent from the object leaves behind no residue as would be the case where the object is simply washed in liquid solvent.

For difficult to remove solids where elevated temperature is necessary to improve the cleaning action of the solvent, or for large volume assembly line operations where the cleaning of metal parts and assemblies must be done efficiently and quickly, the conventional operation of a vapor degreaser consists of immersing the part to be cleaned in a sump of boiling solvent which removes the bulk of the soil, thereafter immersing the part in a sump containing freshly distilled solvent near room temperature, and finally exposing the part to solvent vapors over the boiling sump which condense on the cleaned part. In addition, the part can also be sprayed with distilled solvent before final rinsing.

Vapor degreasers suitable in the above-described operations are well known in the art. For example, Sherliker et al. in U.S. Pat. No. 3,085,918 disclose such suitable vapor degreasers comprising a boiling sump, a clean sump, a water separator, and other ancillary equipment.

Cold cleaning is another application where a number of solvents are used. In most cold cleaning applications the soiled part is either immersed in the fluid or wiped with rags or similar objects soaked in solvents and allowed to air dry.

Fluorocarbon solvents, such as trichlorotrifluoroethane, have attained widespread use in recent years as effective, nontoxic, and nonflammable agents useful in degreasing applications and other solvent cleaning applications. Trichlorotrifluoroethane has been found to have satisfactory solvent power for greases, oils, waxes and the like. It has therefore found widespread use for cleaning electric motors, compressors, heavy metal parts, delicate precision metal parts, printed circuit boards, gyroscopes, guidance systems, aerospace and missile hardware, aluminum parts and the like.

The art has looked towards azeotropic compositions including the desired fluorocarbon components such as trichlorotrifluoroethane which include components which contribute additionally desired characteristics, such as polar functionality, increased solvency power, and stabilizers. Azeotropic compositions are desired because they exhibit a minimum or maximum boiling point and do not fractionate upon boiling. This behavior is desirable because in the previously described vapor degreasing equipment with which these solvents are employed, redistilled material is generated for final rinse-cleaning. Thus, the vapor degreasing system acts as a still. Unless the solvent composition exhibits a constant boiling point, i.e., is an azeotrope or is azeotrope-like, fractionation will occur and undesirable solvent distribution may act to upset the cleaning and safety of processing. Preferential evaporation of the more volatile components of the solvent mixtures, which would be the case if they were not an azeotrope or azeotrope-like, would result in mixtures with changed compositions which may have less desirable properties, such as lower solvency towards soils, less inertness towards metal, plastic or elastomer components, and increased flammability and toxicity.

The art is continually seeking new fluorocarbon based azeotropic mixtures or azeotrope-like mixtures which offer alternatives for new and special applications for vapor degreasing and other cleaning applications. Currently, of particular interest, are such azeotrope-like mixtures which are based on fluorocarbons which are considered to be stratospherically safe substitutes for presently used fully halogenated chlorofluorocarbons. The latter are suspected of causing environmental problems in connection with the earth's protective ozone layer. Mathematical models have substantiated that hydrochlorofluorocarbons, such as 1,1-dichloro-1-fluoroethane (FC-141b), will not adversely affect atmospheric chemistry, being negligible contributors to ozone depletion and to green-house global warming in comparison to the fully halogenated species.

We are aware of only one disclosure of an azeotropic composition including 1,1-dichloro-1-fluoroethane, namely *Anon., Research Disclosures,* Vol. 162, p. 70 (1977) in which it is stated that n-pentane and iso-pentane form binary azeotropes with 1,1-dichloro-1-fluoroethane.

U.S. Pat. No. 3,936,387 discloses the azeotropic composition of methanol with 1,2-dichloro-1-fluoroethane, FC-141, which is an isomer of FC-141b. Similarly, U.S. Pat. No. 4,035,258 discloses the azeotropic composition of ethanol with 1,2-dichloro-1-fluoroethane. This information did not lead us to the azeotropic composition of the invention since, as is well known in this art, there is no published, reliable basis on which to predict azeotropy. Moreover, as is equally well known, the existence of an azeotropic composition does not enable one skilled in the art to predict azeotropy between or among related components. For example, U.S. Pat. No. 3,936,387 discloses that FC-141 and isopropanol form an azeotropic composition, whereas FC-141b and isopropanol do not form an azeotrope.

It is accordingly an object of this invention to provide novel azeotrope-like compositions based on FC-141b which are liquid at room temperature and which will not fractionate under the process of distillation or evaporation, which are useful as solvents for use in vapor degreasing and other solvent cleaning applications including defluxing applications. Another object of the invention is to provide novel environmentally acceptable solvents for use in the aforementioned applications.

DESCRIPTION OF THE INVENTION

In accordance with the invention, novel azeotrope-like compositions have been discovered comprising FC-141b and methanol.

In a preferred embodiment of the invention, the azeotrope-like compositions comprise from about 93 to about 98 weight percent of FC-141b and from about 7 to about 2 weight percent methanol.

In a still preferred embodiment of the invention, the azeotrope-like compositions comprise from about 95.0 to about 97.0 weight percent FC-141b and from about 5 to about 3 weight percent methanol.

Our best estimate of the true azeotrope and our most preferred embodiment is about 96.2 weight percent FC-141b and about 3.8 weight percent methanol which exhibits a boiling point of about 29.8° C. at 765 mm Hg.

All compositions within the above-identified ranges, as well as certain compositions outside the indicated ranges, are azeotrope-like, as defined more particularly below.

The precise or true azeotrope composition has not been determined but has been ascertained to be within the indicated ranges. Regardless of where the true azeotrope lies, all compositions within the indicated ranges, as well as certain compositions outside the indicated ranges, are azeotrope-like, as defined more particularly below.

It has been found that these azeotrope-like compositions are on the whole nonflammable liquids, i.e. exhibit no flash point when tested by the Tag Open Cup test method-ASTM D 1310-86. The vapor phase, however, does exhibit a narrow range of flame limits (9.9–15.2 volume percent in air at ambient conditions).

From fundamental principles, the thermodynamic state of a fluid is defined by four variables: pressure, temperature, liquid composition and vapor composition, or P-T-X-Y, respectively. An azeotrope is a unique characteristic of a system of two or more components where X and Y are equal at the stated P and T. In practice, this means that the components of a mixture cannot be separated during distillation, and therefore in vapor phase solvent cleaning as described above.

For the purpose of this discussion, by azeotrope-like composition is intended to mean that the composition behaves like a true azeotrope in terms of its constant boiling characteristics or tendency not to fractionate upon boiling or evaporation. Such composition may or may not be a true azeotrope. Thus, in such compositions, the composition of the vapor formed during boiling or evaporation is identical or substantially identical to the original liquid composition. Hence, during boiling or evaporation, the liquid composition, if it changes at all, changes only to a minimal or negligible extent. This is to be contrasted with non-azeotrope-like compositions in which during boiling or evaporation, the liquid composition changes to a substantial degree.

Thus, one way to determine whether a candidate mixture is "azeotrope-like" within the meaning of this invention, is to distill a sample thereof under conditions (i.e. resolution-number of plates) which would be expected to separate the mixture into its separate components. If the mixture is non-azeotropic or non-azeotrope-like, the mixture will fractionate, i.e. separate into its various components with the lowest boiling component distilling off first, and so on. If the mixture is azeotrope-like, some finite amount of a first distillation cut will be obtained which contains all of the mixture components and which is constant boiling or behaves as a single substance. This phenomenon cannot occur if the mixture is not azeotrope-like i.e., it is not part of an azeotropic system. If the degree of fractionation of the candidate mixture is unduly great, then a composition closer to the true azeotrope must be selected to minimize fractionation. Of course, upon distillation of an azeotrope-like composition such as in a vapor degreaser, the true azeotrope will form and tend to concentrate.

It follows from the above that another characteristic of azeotrope-like compositions is that there is a range of compositions containing the same components in varying proportions which are azeotrope-like. All such compositions are intended to be covered by the term azeotrope-like as used herein. As an example, it is well known that at differing pressures, the composition of a given azeotrope will vary at least slightly as does the boiling point of the composition. Thus, an azeotrope of A and B represents a unique type of relationship but with a variable composition depending on temperature and/or pressure. Accordingly, another way of defining azeotrope-like within the meaning of this invention is to state that such mixtures boil within about ±0.05° C. (at about 765 mm Hg) of the 29.8° C. boiling point of the most preferred composition disclosed herein. As is readily understood by persons skilled in the art, the boiling point of the azeotrope will vary with the pressure.

In the process embodiment of the invention, the azeotrope-like compositions of the invention may be used to clean solid surfaces by treating said surfaces with said compositions in any manner well known to the art such as by dipping or spraying or use of conventional degreasing apparatus.

The FC-141b and methanol components of the novel solvent azeotrope-like compositions of the invention are known materials and are commercially available. Preferably they should be used in sufficiently high purity so as to avoid the introduction of adverse influences upon the solvency properties or constant boiling properties of the system.

EXAMPLE 1

This example shows that a minimum in the boiling point versus composition curve occurs in the region of 96.2 weight percent 1,1-dichloro-1-fluoroethane and 3.8 weight percent methanol, indicating that an azeotrope forms in the neighborhood of this composition.

The temperature of the boiling liquid mixtures was measured using comparative ebulliometry in essentially the same manner as described by W. Swietoslawski in "Ebulliometric Measurements", p. 14, *Reinhold Publishing Corp.*, (1945). Two ebulliometers, each charged with measured quantities of 1,1-dichloro-1-fluoroethane, were used in the present example. The ebulliometers were interconnected via a large ballast volume, in which the pressure was maintained to within ±0.05 mm Hg using a supply of dry air controlled with a solenoid valve and an electronic pressure transducer. Precise pressure control is necessary for accurate boiling point determinations.

Each ebulliometer consisted of an electrically heated sump in which the 1,1-dichloro-1-fluoroethane was brought to boil. A condenser was connected to this sump and the system was operated under total reflux. Slugs of boiling liquid and vapor were pumped from the sump, via a Cottrell pump, over a thermowell, which contained a calibrated thermistor used for precise temperature measurements. After bringing the 1,1-dichloro-1-fluoroethane to boil under controlled pressure, measured amounts of methanol were titrated into one of the ebulliometers. The change in boiling point was measured with reference to the other ebulliometer, which still contained only 1,1-dichloro-1-fluoroethane.

Temperature and pressure measurements, as well as the measured titration, were all performed automatically with the aid of a computerized data acquisition system. Boiling point measurements were performed at two pressures, generally in the region of 760 mm Hg and 765 mm Hg, for each composition. These measurements were corrected to exactly 760 mm Hg and 765 mm Hg by applying a small, measured, linear correction. Such boiling point measurements are believed accurate to ±0.002° C.

The following Table I shows the boiling point measurements, corrected to 765 mm Hg, for various mixtures of 1,1-dichloro-1-fluoroethane and methanol. Interpolation of these data shows that a minimum boiling point occurs in the region of about 3 to 5 weight percent methanol. The best estimate of the precise minimum is 3.8 weight percent methanol, although the mixtures are constant boiling, to within 0.01° C., in the region of about 3 to 5 weight percent methanol. A minimum boiling azeotrope is thus shown to exist in this composition region.

TABLE I

| | LIQUID MIXTURE | |
| --- | --- | --- |
| Parts By Weight 1.1-dichloro-1-fluoroethane | Parts By Weight Methanol | Boiling Point (°C.) at 765 mm Hg |
| 100. | 0. | 32.226 |
| 99.55 | 0.45 | 30.873 |
| 99.11 | 0.89 | 30.251 |
| 98.81 | 1.19 | 30.078 |
| 98.52 | 1.48 | 29.976 |
| 98.23 | 1.77 | 29.910 |
| 97.94 | 2.06 | 29.866 |
| 97.66 | 2.34 | 29.839 |
| 97.37 | 2.63 | 29.823 |
| 97.09 | 2.91 | 29.813 |
| 96.80 | 3.20 | 29.805 |
| 96.52 | 3.48 | 29.802 |
| 96.24 | 3.76 | 29.801 |
| 95.97 | 4.03 | 29.801 |
| 95.55 | 4.45 | 29.805 |
| 95.14 | 4.86 | 29.808 |
| 94.74 | 5.26 | 29.814 |
| 94.07 | 5.93 | 29.822 |
| 93.41 | 6.59 | 29.826 |
| 92.79 | 7.21 | 29.830 |

EXAMPLE 2

This example further confirms the existence of the azeotrope between 1,1-dichloro-1-fluoroethane and methanol via the method of distillation.

A 5-plate Oldershaw distillation column with a cold water condensed automatic liquid dividing head was used for this example. The distillation column was charged with approximately 340 grams of a 3.7 weight percent methanol and 96.3 weight percent, 1,1-dichloro-1-fluoroethane mixture which was heated under total reflux for about an hour to ensure equilibration. A reflux ratio of 10:1 was employed for this particular distillation. Approximately 40 percent of the original charge was collected in five similar-sized overhead fractions. The compositions of these fractions, in addition to the composition of the liquid residue, were analyzed using gas chromatography. Table II shows that the compositions of the starting material, the five distillate fractions and the liquid residue are identical, within the uncertainty associated with determining the compositions, indicating that the mixture is an azeotrope.

TABLE II

| | Mixture Composition | |
| --- | --- | --- |
| Mixture | Parts by Weight 1,1-dichloro-1-fluoroethane | Party by Weight Methanol |
| Original Charge | 96.3 | 3.7 |
| Distillate Fraction #1 | 96.3 | 3.7 |
| Distillate Fraction #2 | 96.3 | 3.7 |
| Distillate Fraction #3 | 96.3 | 3.7 |
| Distillate Fraction #4 | 96.3 | 3.7 |
| Distillate Fraction #5 | 96.3 | 3.7 |
| Liquid Residue | 96.5 | 3.5 |

Barometric pressure was 741 mm Hg

The compositions of the invention are useful as solvents in a variety of vapor degreasing, cold cleaning and solvent cleaning applications including defluxing.

It is known in the art that the use of more active solvents, such as lower alkanols in combination with certain halocarbons such as trichlorotrifluoroethane, may have the undesirable result of attacking reactive metals such as zinc and aluminum, as well as certain aluminum alloys and chromate coatings such as are commonly employed in circuit board assemblies. The art has recognized that certain stabilizers, such as nitromethane, are effective in preventing metal attack by chlorofluorocarbon mixtures with such alkanols. Other candidate stabilizers for this purpose, such as disclosed in the literature, are secondary and tertiary amines, olefins and cycloolefins, alkylene oxides, sulfoxides, sulfones, nitrites and nitriles, and acetylenic alcohols or ethers. It is contemplated that such stabilizers may be combined with the azeotrope-like compositions of this invention.

What is claimed is:

1. Azeotrope-like compositions consisting essentially of 1,1-dichloro-1-fluoroethane and methanol which boil at about 29.8° C.±0.05° C. at about 765 mm Hg.

2. Azeotrope-like compositions consisting essentially of from about 93.0 to about 98.0 weight percent 1,1-dichloro-1-fluoroethane and from about 7 to about 2 weight percent methanol.

3. Azeotrope-like compositions according to claim 2 comprising from about 95.0 to about 97.0 weight percent 1,1-dichloro-1-fluoroethane and from about 5 to about 3 weight percent methanol.

4. Azeotrope-like compositions according to claim 3 comprising about 96.2 weight percent 1,1-dichloro-1-fluoroethane and about 3.8 weight percent methanol.

5. The method of cleaning a solid surface which comprises treating said surface with an azeotrope-like composition as defined in claim 1.

6. The method of cleaning a solid surface which comprises treating said surface with an azeotrope-like composition as defined in claim 2.

7. The method of cleaning a solid surface which comprises treating said surface with an azeotrope-like composition as defined in claim 3.

8. The method of cleaning a solid surface which comprises treating said surface with an azeotrope-like composition as defined in claim 4.

* * * * *

UNITED STATES PATENT AND TRADEMARK OFFICE

Certificate

Patent No. 4,842,764                                                Patented: June 27, 1989

On petition requesting issuance of a certificate of correction of inventorship pursuant to 35 U.S.C. 116 it has been found that the above-identified patent, through error and without any deceptive intent, improperly sets forth the inventorship. Accordingly, it is hereby certified that the correct inventorship of this patent is:
Ian R. Shankland, David Paul Wilson Signed and Sealed this First Day of May, 1990

PAUL LIEBERMAN

*Supervisory Primary Examiner*
*Patent Examining Group 110*